(12) United States Patent
Seech et al.

(10) Patent No.: US 7,347,647 B2
(45) Date of Patent: Mar. 25, 2008

(54) COMPOSITE MATERIAL FOR A PERMEABLE REACTIVE BARRIER

(75) Inventors: Alan G. Seech, Mississauga (CA); David D. Hill, Mississauga (CA); Evica Dmitrovic, Mississauga (CA); Kerry W. Bolanos-Shaw, Brampton (CA)

(73) Assignee: Adventus Intellectual Property Inc., Mississauga, Ontario (CA)

( * ) Notice: Subject to any disclaimer, the term of this patent is extended or adjusted under 35 U.S.C. 154(b) by 0 days.

(21) Appl. No.: 10/547,854

(22) PCT Filed: Mar. 3, 2004

(86) PCT No.: PCT/IB2004/001573

§ 371 (c)(1),
(2), (4) Date: Jun. 12, 2006

(87) PCT Pub. No.: WO2004/079030

PCT Pub. Date: Sep. 16, 2004

(65) Prior Publication Data

US 2007/0025820 A1 Feb. 1, 2007

Related U.S. Application Data

(60) Provisional application No. 60/451,467, filed on Mar. 3, 2003.

(51) Int. Cl.
*A62D 3/00* (2007.01)
*C02F 1/00* (2006.01)
*B09C 1/00* (2006.01)

(52) U.S. Cl. .............. 405/129.65; 405/128.75

(58) Field of Classification Search ........... 405/129.45, 405/129.6, 129.65, 128.7, 128.75
See application file for complete search history.

(56) References Cited

U.S. PATENT DOCUMENTS 5,411,664 A * 5/1995 Seech et al. ............. 210/602
6,350,383 B1 * 2/2002 Douglas ..................... 210/747
6,423,531 B1 * 7/2002 Hince et al. ............. 435/262.5
6,719,902 B1 * 4/2004 Alvarez et al. ............ 210/601
2003/0073877 A1 * 4/2003 Yen ............................ 588/236

FOREIGN PATENT DOCUMENTS

| DE | 251 740 A | 11/1987 |
| EP | 0 933 333 A | 8/1999 |
| EP | 0 933 333 A1 | 8/1999 |
| EP | 0 933 333 A2 | 8/1999 |
| JP | 56045992 A * | 4/1981 |

OTHER PUBLICATIONS

International Search Report for PCT/IB04/01573, dated Aug. 26, 2004; ISA/EP.

* cited by examiner

*Primary Examiner*—John Kreck
(74) *Attorney, Agent, or Firm*—Paul E Schaafsma; NovusIP, LLC

(57) ABSTRACT

Compositions in accordance with the principles of the present invention comprise a compressed mixture of fibrous organic materials and multi-valent metals used to remove organic chemical contaminants. The compositions are made into a pre-shaped, compressed form used to form a permeable reactive barrier for decontamination of soils, sediments, sludges, and waters containing environmental pollutants. The compressed mixture, comprising the fibrous organic particles and one or more multivalent metallic particles, is formed into reactive pellets, granules, and other pre-shaped structures for use in constructing a reactive barrier, typically for use in a contaminated environment or in an industrial process. By way of example, the pre-shaped structure may be used to construct a reactive barrier to remove halogenated organic chemical contaminants, nitroaromatic organic contaminants, or certain inorganic contaminants from various terrestrial and aquatic based ecosystems.

27 Claims, 2 Drawing Sheets

COMPOSITE MATERIAL FOR A PERMEABLE REACTIVE BARRIER

CROSS REFERENCE TO RELATED APPLICATIONS

This application claims priority from and is related to U.S. Provisional Patent Application No. 60/451,467 titled "Pelletized Material for a Permeable Reactive Barrier" filed Mar. 3, 2003.

FIELD OF THE INVENTION

The invention relates to the removal of contaminants.

BACKGROUND OF THE INVENTION

Many halogenated and nitroaromatic organic chemical contaminants in the environment are highly resistant to degradation. Once the halogenated organic chemical contaminant is dehalogenated or the nitro groups are reduced to amine groups, the organic contaminants are usually degraded easily, generally by aerobic microbial processes. Degradation of organic contaminants in microbial ecosystems occurs both by enzymatic and non-enzymatic mechanisms. Most enzymatic reactions involve whole microbial cells such as bacteria, fungi, and algae. Enzymatic reactions are usually more specific than non-enzymatic reactions, but the activity of enzymatic reactions is destroyed by harsh conditions such as exposure to high temperatures. Microbial activity can assist degradation of organic contaminants either directly by enzyme production or indirectly by maintaining the reducing conditions of the environment. Either way, microbial activity enhances both the inorganic and biochemical mechanisms by which degradation of organic contaminants occurs.

Currently, certain environmental remediation methods employ the use of relatively small, finely comminuted, segregated particles of various types of materials that are typically mixed on site, in proportions and amounts selected by on-site personnel. For example, where such materials are used, on-site personnel are required to thoroughly mix quantities of the various components and, in most instances, incubate small batches of mixtures to establish sufficient beneficial microbial growth to permit use. The personnel must then apply those incubated components into the target environment. In these prior art systems, on-site personnel have used iron filings alone, comminuted fibrous organic materials alone, iron filings combined and then mixed on site with comminuted fibrous organic materials or iron filings mixed on site with sand.

Many earlier systems using iron filings alone, comminuted organic materials alone, or even iron filings with sand, are often ineffective in treating sites which are contaminated with various organic chemicals. Each of these systems sought to use individual ingredients provided in the form of relatively fine, segregated particles of one or more ingredients, to obtain a relatively high reactive surface area per volume (and hence weight and expense) of the material to be added to the contaminated site.

Even those systems contemplating the use of more than one additive encounter problems relating to on-site measurement, mixing, and application of the ingredients to the target area. By way of example, there is a tendency for on-site personnel to inadequately mix the desired components, often leading to pockets or zones with too much or too little of a desired ingredient. Even if the ingredients were adequately mixed, the ingredients might not be mixed in appropriate ratios to achieve target concentrations determined to be optimal for the particular application. Mixtures of two or more ingredients also had a tendency to stratify due to differences in physical properties such as density and average particle sizes. In addition, even where prior art systems contemplated the mixture of fine particles of two or more ingredients, various transportation and handling problems would arise. Some ingredients tended to generate dust and other unpleasant handling conditions for on-site personnel.

Therefore, there is a need for a composition for treating contaminated regions that is easy to use, economical, and effective.

SUMMARY OF THE INVENTION

Compositions in accordance with the principles of the present invention are easy to use, economical, and effective. A composition in accordance with the principles of the present invention comprises a compressed mixture of fibrous organic materials and multi-valent metals used to remove organic chemical contaminants. The compressed mixture—comprising the fibrous organic particles and one or more multivalent metallic particles—is formed into reactive pellets, granules, and other pre-shaped structures for use in constructing a reactive barrier, typically for use in a contaminated environment or in an industrial process. In one embodiment of the present invention, for example, the pre-shaped structure may be used to construct a reactive barrier to remove halogenated organic chemical contaminants, nitroaromatic organic contaminants, and certain inorganic chemical contaminants from various terrestrial and aquatic based ecosystems. In one application, a permeable reaction barrier is used in accordance with the principles of the present invention.

Compositions in accordance with the principles of the present invention may comprise a pre-shaped structure. In one embodiment of the present invention, the pre-shaped structure comprises a compressed mixture of organic matter, preferably comminuted and fibrous, and a metal, preferably comminuted elemental iron in its zero valent form. Preferably, the pre-shaped structure is rigid. The ingredients of the composition of the present invention may be supplemented with binders, water, pH buffering agents, or other materials designed to confer specific characteristics upon the pre-shaped structure. One embodiment of the present invention is illustrated in FIG. 2. As seen in FIG. 2, composite material in accordance with the principles of the present invention comprises a slow release solid carbon 21, a zero valent iron particle 23, and a pH buffering agent 25 such as zeolite. A pre-shaped structure in accordance with the present invention may be used as an additive to contaminated environments in both terrestrial and aquatic systems, or as an additive to industrial and effluent treatment equipment and systems.

The present invention provides a number of advantages over the prior art environmental remediation methods. Compositions in accordance with the principles of the present invention may be employed for the treatment of solid materials such as but not limited to soil, sediment, or sludge, or for treatment of liquid materials such as but not limited to groundwater, surface waters, or industrial process waters. In general, compositions in accordance with the principles of the present invention have utility wherever contaminants may be destroyed by exposing them to strong reducing conditions. Specific examples include but are not limited to dechlorination and debromination of chlorinated or brominated organic compounds, reduction of nitro-substituted organic compounds, and reduction of nitrate and perchlorate in either terrestrial or aquatic environments. Reduction of certain metallic contaminants is also possible in cases when their reduction converts the metal into a less soluble form that will precipitate in the reactive barrier. Compositions in accordance with the principles of the present invention are particularly well suited to use in, for example but not limited to, treatment of contaminated groundwater as it passes through a reactive barrier such as a wall-type structure, an enriched region of the native aquifer material, a bed, or a column through which the contaminated water is made to flow.

DETAILED DESCRIPTION OF THE PREFERRED EMBODIMENTS

Figure 1:
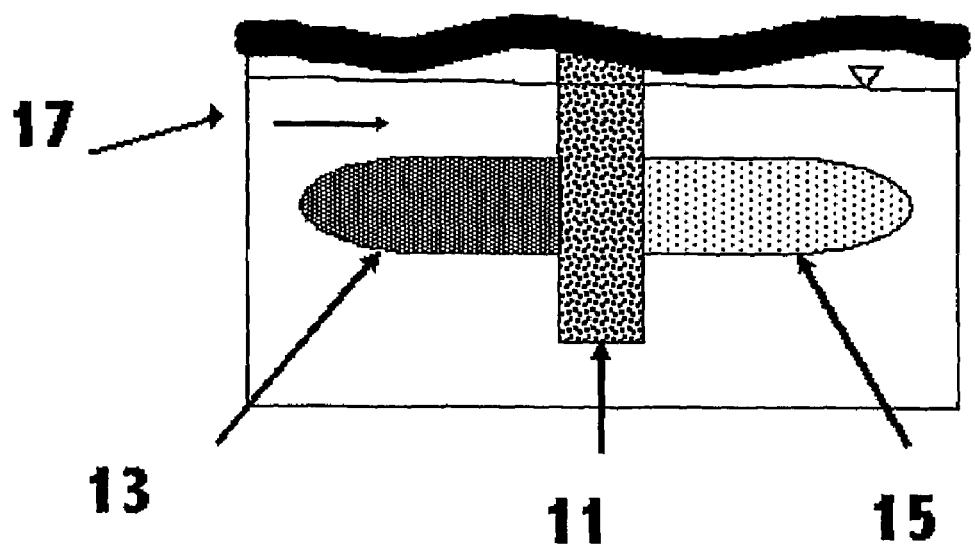
FIG. 1 is a cross-sectional diagram of a permeable reaction barrier in accordance with the principles of the present invention for the treatment of groundwater.
Figure 2:
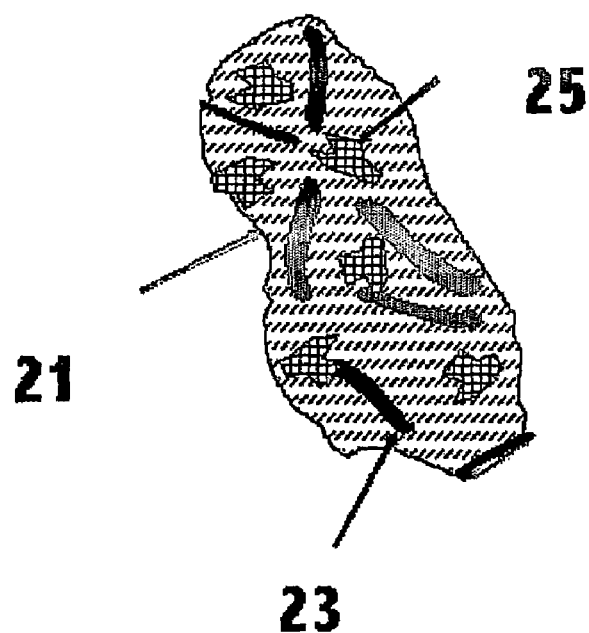
FIG. 2 is a cross-sectional view of composite material in accordance with the principles of the present invention for use in a permeable reaction barrier for groundwater treatment.

The present invention relates to compositions for treating contaminated regions that are easy to use, economical, and effective. Compositions in accordance with the principles of the present invention provide an admixture of organic and inorganic particles that have been formed into a pre-shaped structure. In one embodiment of the present invention, the pre-shaped structure is preferably a cylindrical pellet or a rectangular prism such as a cube. It is desirable to combine the organic and inorganic materials into a pre-shaped structure to ensure that the two classes of ingredients are uniformly and intimately co-mingled so that the key individual components (i.e., the organic particles that serve as food for microorganisms and the inorganic particles that serve as chemical oxygen scavengers) are and will continue to be uniformly distributed throughout a reactive barrier (PRB), or soil, for a relatively long period of time. As seen in FIG. 1, the PRB 11 is situated near the contaminated region, for example contaminated groundwater 13. Preferably the PRB 11 is situated in close proximity but somewhat downstream from the contaminated groundwater 13. The contaminated water flows a direction 17, enters the PRB 11 where the decontamination occurs and treated groundwater 15 exits the PRB 11.

The pre-shaped structure of the present invention is a combination of organic matter and certain multi-valent metal particles. The organic matter is capable of supporting organisms such as but not limited to microorganism (e.g. bacteria) or fungal growth. The pre-shaped structure is added to soil, water, sediment, and environments containing organic contaminants such as nitroaromatic organic chemicals and halogenated organic chemicals. This is done in order to provide an environment that has a stable negative redox potential, that is, a reducing environment that is conducive to reduction of nitro groups to amine groups and the reductive dehalogenation and subsequent enhanced degradation or decomposition of the nitroaromatic and halogenated organic contaminants.

Microorganisms should be present in the reactive barrier, soil, or water during operation or use. Generally, the necessary microorganisms are indigenous to the organic material ingredients in the pre-shaped structure and in the contaminated environment. Where it is desirable or necessary to do so, additional microorganisms may be added as a supplement to the contaminated environmental sector or system. In some embodiments of the present invention, it may be desirable to add microorganisms as one of the ingredients included in the pre-shaped structure; however, it is not essential that the microorganisms be added to the compressed material. For example, in one embodiment of the present invention the microorganisms are applied separately to the reactive barrier during or after construction. Other approaches for ensuring adequate microbial growth also are possible and will be understood by those skilled in the art.

For purposes of explanation only and not by way of limitation, it is believed that the organic matter provides nutrients for aerobic and facultatively anaerobic microorganisms. The growth of these microorganisms consumes oxygen, which promotes anaerobic conditions and in turn lowers the redox potential of the environment. The redox potential also may be lowered by reducing compounds such as sulfur-containing amino acids and the like, which may be present in the organic matter, and also may be lowered by the reducing power of the multi-valent metal particles.

This environment promotes the growth of anaerobic microorganisms whose activity lowers and maintains a strong negative redox potential, that is, it creates strong reducing conditions that are conducive to reductive degradation of nitroaromatics and to dehalogenation reactions. The resulting system contains a wide spectrum of inorganic, biochemical, and enzymatic redox systems, some or all of which promote the reductive degradation of nitroaromatic organic contaminants and dehalogenation of the halogenated organic contaminants. After degradation of the nitro groups and/or dehalogenation of the halogenated organic contaminants, the organic contaminants tend to be more readily degradable; thus, the organic contaminants will rapidly decompose or decay by natural processes in the environment, particularly if aerobic conditions are subsequently allowed or maintained.

The organic matter of the present invention should be suitably comminuted to a size and typical particle shape that will allow it to be readily mixed with the other ingredients, such as but not limited to comminuted multi-valent metallic particles. The organic ingredients also should be capable of supporting bacterial or fungal growth in the reactive barrier. It is believed that the use of fibrous organic matter permits temporary absorption of the nitroaromatic and halogenated organic chemical contaminants into the fibrous structure, thereby enhancing the extent of contaminant degradation and removal from the environment. Suitable fibrous organic matter is generally derived from plant matter such as but not limited to crops, crop residues, bushes or trees including their byproducts (for example sawdust), grass and weeds, and algae.

In certain embodiments of the present invention, it also may be beneficial to blend different sources of plant matter together. Plant matter that is high in nitrogen content, for example but not limited to, leguminous plant matter is particularly preferred. Alternatively, the plant matter may be supplemented with nitrogenous material such as but not limited to amines and nitrates, including but not limited to ammonium nitrate, urea, calcium nitrate, the like, and mixtures thereof. The plant matter also may be supplemented with other fibrous or non-fibrous organic matter such as simple carbon sources including but not limited to carbohydrates such as sugars, organic acids such as lactic acids, the like and mixtures thereof. Complex organic matter also may be used, including but not limited to sewage sludge, potato processing waste, molasses, spent distiller grains, spent coffee grounds, the like and mixtures thereof.

The fibrous organic matter is preferably cut or comminuted into small particles in order to increase the exposed surface area of the organic ingredients to be mixed, compressed, and shaped with the multi-valent metallic ingredients. While the particle size of the fibrous organic ingredients is not critical to the present invention, generally it is preferred that the fibrous organic ingredients will be comminuted to an effective diameter or size that will often be considerably smaller than the overall size of the compressed structure. For example, the fibrous organic particles are preferably in the range of from about 0.001 mm to about 5 mm. In certain embodiments of the present invention it also will be preferred that the comminuted fibrous organic material will be highly resistant to premature or excessive microbial degradation. Comminuted fibrous organic material that are highly resistant to premature or excessive microbial degradation include for example, but not limited to, finely comminuted particles made from coconut, walnut, or almond shells. However, other fibrous organic plant materials also may be used, bearing in mind the conditions under which the pre-shaped structure will be used.

Suitable multi-valent metal particles for use in the present invention include those multi-valent metals that are capable of being oxidized and reduced under normal environmental conditions, and which have average particle diameters ranging from about 0.001 mm to about 5 mm. Among these would be the elemental or zero valent forms of many common metals such as but not limited to iron, magnesium, zinc, and aluminum. Iron, magnesium, and mixtures thereof are the most preferred metals due to their moderately low toxicity and good reducing power. Other preferred multi-valent metals for use in this invention include zinc, copper, cobalt, nickel, and mixtures thereof. However, due to the relatively high toxicity of these metals, they are generally added in lower concentrations to minimize their own detrimental effects on treated soil, sediment, sludge, water, and other environmental systems.

In the pre-shaped structure of the present invention, the resulting weight ratio of metal particles to comminuted fibrous organic matter ranges from about 1:1 to about 1:500,000 respectively. When the multivalent metal particles comprise iron, magnesium, or mixtures thereof, the weight range of metal particles to organic matter is preferably in the range about 1:1 to about 1:10,000 respectively. When the multivalent metal particles comprise zinc, copper, cobalt, nickel or mixtures thereof, the weight range of metal particles to comminuted organic matter is preferably in the range about 1:10 to about 1:500,000 respectively.

Mixtures of metal particles also may be included in the pre-shaped structure of the present invention. For example, some redox systems such as those based on porphyrins are complexed with iron while others such as corins are complexed with cobalt. Thus, it may be advantageous to treat some contaminated environments with a pre-shaped structure including a combination of multi-valent metals such as but not limited to a mixture of iron and cobalt. One of ordinary skill in the art would understand from the teachings of the present invention that numerous redox systems could be used, thereby utilizing various compounds and metals without departing from the scope and intention of the present invention.

The pre-shaped structure also may be made from a mixture of ingredients including porosity enhancers. For example, zeolite, bentonite, sand, glass particles, fibers and filaments, and other inert particulates may be added to enhance the effective surface area of the pre-shaped structure, including pellets and cubes.

Other additives included in admixture with the pre-shaped structure may include fats and oils made available because of desirable chemical and physical properties. For example, some fats and oils may be useful as coating agents, to protect the organic particles against premature or excessive degradation. Other fats and oils may be selected because they also may retard excessive growth of certain microbial colonies. Furthermore, some fats and oils may be useful additives because of their suitability to act as binding agents, and in some instances because of other, additional, desirable performance qualities.

Other suitable binding agents may be selected from commercially available sources. The binding agents will most often be selected after consideration of their long term effectiveness in maintaining the rigidity and permanence of the compressed material structure, their impact on microbial growth, and the absence of any significant negative impact on the surrounding environment. Preferably, the binding agent will be inert and will not detrimentally affect performance of the reactive barrier, microbial growth and related chemical processes, or the quality of the treated soil, sludge, sediment, water or other system.

In one embodiment of the present invention, a pre-shaped, compressed pellet or cube is made from a mixture of finely comminuted fibrous organic material and fine iron filings in which the weight ratio of iron to organics is about 1:20. In a preferred embodiment of the present invention, the mixture used to manufacture the pre-shaped structure includes an amount of fine iron filings representing a concentration of about 5% to about 20% (weight by weight) of the compressed mixture, an amount of comminuted fibrous organic material (such as comminuted plant material) representing about 5% to about 80% (weight by weight) of the compressed mixture, an amount of porosity enhancer representing up to about 90% (weight by weight) of the compressed mixture, and a minor amount of binding agent (representing less than about 1% to about 2% (weight by weight) of the compressed mixture).

In another embodiment of the present invention, a pre-shaped, compressed structure comprises a mixture of solid inorganic and solid organic particles formed into a rigid structure for use in environmental remediation. In a preferred embodiment of the present invention, the inorganic portion comprises iron particles and the organic portion comprises comminuted fibrous organic material, such as comminuted plant matter. These solid particulate ingredients may be supplemented and mixed with liquids including water and fats or oils to aid in processing or to confer specific nutritional, physical, or chemical characteristics to the finished structure. For example, fats or oils may be added to slow the rate at which the organic material is biodegraded by microorganisms after the structure has been placed into the contaminated soil or water. By way of further example, a preferred fatty additive may include lanolin because of its hydrophobic qualities, particularly when used to coat fibrous organic ingredients, and to slow microbial degradation of the fibrous organic material in the pre-shaped structure. In some embodiments, other fats and oils may be used as an additive to enhance microbial growth. By way of further example, water or fluids and binding agents may be used during processing to aid in mixing and compaction of the organic and inorganic ingredients.

In some embodiments of the present invention it will be preferred that other additives will be non-biodegradable and inert. Some additives may be desirable as performance enhancers and other additives may be selected as retardants to slow or inhibit certain undesirable reactions and processes. Zeolite also is an example of a performance enhancer when added as an ingredient for increased porosity, pH buffering, ion exchange capability, or other benefits. Additives having nutritive qualities also may be included in admixture with the pre-shaped structure of the present invention.

Although the preferred shapes of the pre-shaped structure of the present invention will most often be in the form of cylindrical pellets or cubes, many other shapes and configurations will be possible. For example, irregular shapes may be desirable so that, when the pre-shaped structures are placed into the target bed, column or other system, certain fluid flow patterns will be experienced or other performance characteristics will be achieved for the particular field of use. By way of further example, it may be desirable to form hollow cylinders, rings, or saddle shaped structures so that the hollow cylinders, rings, or "saddles", when placed into a column or other reactive barrier, will create many intricate and interconnecting fluid flow channels along the length of the reactive barrier. It also may be desirable to utilize more than one form of pre-shaped structure in any given application. In other embodiments of the present invention, it may be desirable to provide compact, relatively uniform structures that will stack tightly when placed into a column or other barrier to provide fewer and more restricted fluid flow channels to reduce the rate of flow through the reactive barrier and to increase the time available for the contaminants to react before they are carried out of the reactive barrier by, for example, flowing water.

In a preferred embodiment of the present invention, the pre-shaped rigid structure is compressed to a density greater than that of water or of most aqueous systems, to inhibit flotation, migration, or escape of the pre-shaped structure, such as pellets and cubes, from the intended target site. Additives may be included in the mixture to maintain the shape and rigidity of the preshaped structure over the contemplated useful life of the reactive barrier.

It is expected that certain embodiments of the pre-shaped structure included in the present invention will be manufactured in standard feed mills or standard flour mills. Such pre-shaped structures will often be configured as, cylindrical pellets with diameters of between about 1/16 inch and about 1/4 inch and lengths of up to about 1 inch. In addition, many mills are be capable of manufacturing cubes that can have dimensions from as small as about 25 mm square to about 30 mm×70 mm.

It may be possible to achieve a more complete or effective treatment or removal of contaminants with the present invention because the ingredient materials are combined to create an environment conducive to removal of contaminants (that is, the inorganic particles and the organic particles). The ingredients are intimately mixed, then compressed together into a homogenous, pre-shaped structure. This pre-shaped structure will tend to minimize or eliminate the problem of stratification of materials in the soil, sediment, sludge, bed, column, reactive wall, or other permeable reactive barrier that might otherwise occur due to differences in densities and particle sizes of the individual components.

Lower materials costs may be achieved with the present invention because the pre-shaped product will have a higher overall density, resulting from compressing and shaping the organic and inorganic particles (and where appropriate, other ingredients). The ingredients are shaped and compressed into a larger, denser structure, which will tend to, among other benefits, reduce transportation costs.

It may be possible to build the reactive barrier, such as a reactive wall or column, more quickly with the present invention; thereby incurring lower construction costs. Currently, the rate of filling a reactive barrier is slow because the various conventional, particulate materials to be placed in the barrier must be thoroughly mixed prior to placement and only small amounts of the conventional materials are placed at one time in an effort to reduce stratification of the materials due to large differences in density.

In many instances, reactive barriers of the present invention will tend to have a longer effective life. The organic material contained within the pre-shaped structure, which has been compressed into a shape such as but not limited to a dense pellet or cube, has less available surface area per unit of volume and, hence, will be more slowly biodegraded by microorganisms. The compressed nature of the organic and inorganic particles results in a slower-release of nutrients and carbon to microorganisms present in the water, sediment, or soil. In certain embodiments of the present invention it also may be desirable and advantageous to incorporate into the pre-shaped structure an ingredient designed to inhibit biodegradation of the organic portion of the pellet, cube, or other pre-shaped structure, to thereby further lengthen the effective life of the treatment system.

Figure 3:
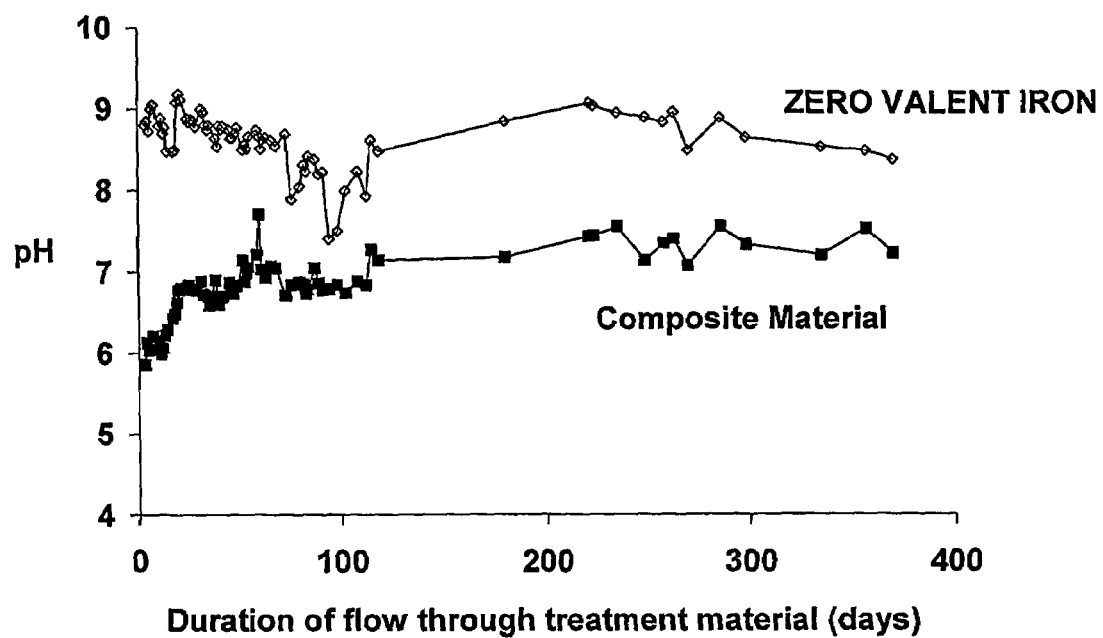
FIG. 3 is a chart comparing the pH produced in traditional ZIV permeable reaction barriers with the pH produced a permeable reaction barrier in accordance with the principles of the present invention.
Figure 4:
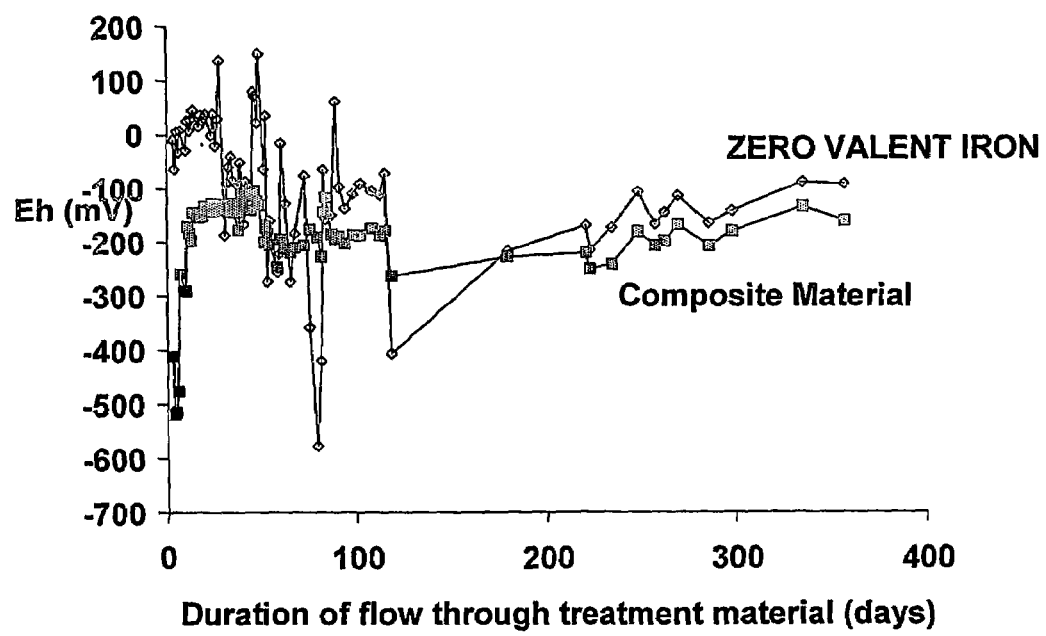
FIG. 4 is a chart comparing the Eh produced in a traditional ZIV permeable reaction barriers with the Eh produced a permeable reaction barrier in accordance with the principles of the present invention.

It may be possible to achieve a longer effective life of the inorganic portion of the pre-shaped structure of the present invention due to a series of favorable biochemical reactions that take place as microorganisms consume the organic portion of the structure in very close proximity to the inorganic portion. Specifically, it is believed that when the inorganic portion is composed of elemental iron in its zero-valent form, the surface of the iron will be continuously exposed to organic acids which are released as microorganisms anaerobically metabolize the organic portion of the structure. Exposure to the organic acids, including acetic, propionic, and butyric acid, will reduce the rate at which the surface of the iron particles is occluded by precipitates, such as carbonates, iron oxides, or iron hydroxides, which are often abundant in soil and water. This phenomenon is illustrated by the fact that pH remains substantially lower in a PRB 11 composed of the composite material of the present invention than in a PRB 11 composed of zero-valent iron alone. FIG. 3 illustrates that the pH produced in a traditional zero-valent iron permeable reaction barriers is not as acidic as the pH produced a permeable reaction barrier in accordance with the principles of the present invention. This favorable alteration of the pH in the PRB 11 does not alter its ability to destroy contaminants since the redox conditions in the PRB 11 composed of the composite material is as negative, or more negative, as those found in a PRB 11 composed solely of zero-valent iron. As seen in FIG. 4 the Eh produced in a traditional zero-valent iron permeable reaction barriers is not low as the Eh produced a permeable reaction barrier in accordance with the principles of the present invention.

The foregoing are examples of certain embodiments of the present invention. Many other embodiments, including modifications and variations thereof, also are possible and will become apparent to those skilled in the art upon a review of the invention as described herein. Accordingly, all suitable modifications, variations and equivalents may be resorted to, and such modifications, variations and equivalents are intended to fall within the scope of the invention as described herein and within the scope of the issued patent claims.

What is claimed is:

1. A method of removing contaminates from an area of contamination comprising:
   providing a pre-shaped, compressed mixture including an effective amount of fibrous organic material capable of supporting bacterial growth and an effective amount of multivalent inorganic material capable of removing organic chemical contaminants;
   placing the pre-shaped, compressed mixture in the area of contamination to form a permeable reactive barrier for decontamination; and
   providing an environment to promote conversion of the contaminants to less harmful compounds.

2. The method of claim 1, wherein the multivalent inorganic material is a metal.

3. The method of claim 2, wherein the metal is taken from the group consisting of zinc, copper, cobalt, nickel, and mixtures thereof.

4. The method of claim 2, wherein the metal is taken from the group consisting of iron, magnesium, and mixtures thereof.

5. The method of claim 1, wherein the fibrous organic material is plant matter.

6. The method of claim 5, wherein the plant matter is leguminous plant matter.

7. The method of claim 1 further comprising nitrogenous material.

8. The method of claim 1 further comprising simple carbon sources.

9. The method of claim 1 further comprising complex carbon sources.

10. The method of claim 1 further comprising shaping the pre-shaped compressed mixture into a pellet.

11. The method of claim 1 further comprising shaping the pre-shaped, compressed mixture into a cube.

12. The method of claim 1 further comprising shaping the pre-shaped, compressed mixture into a granule.

13. A method of removing contaminates from an area of contamination comprising:
   providing an effective amount of a fibrous organic portion capable of supporting bacterial growth;
   providing an effective amount of an inorganic portion including at least one multivalent metal capable of removing organic chemical contaminants;
   compounding together the fibrous organic portion and the inorganic portion to form a pre-shaped, compressed mixture; and
   placing the pre-shaped, compressed mixture in the area of contamination to form a permeable reactive barrier for decontamination.

14. The method of claim 13, wherein the metal is taken from the group consisting of zinc, copper, cobalt, nickel, and mixtures thereof.

15. The method of claim 13, wherein the metal is taken from the group consisting of iron, magnesium, and mixtures thereof.

16. The method of claim 13, wherein the fibrous organic material is plant matter.

17. The method of claim 13, wherein the plant matter is leguminous plant matter.

18. The method of claim 13 further comprising nitrogenous material.

19. The method of claim 13 further comprising simple carbon sources.

20. The method of claim 13 further comprising complex carbon sources.

21. The method of claim 13 further comprising shaping the pre-shaped, compressed mixture into a pellet.

22. The method of claim 13 further comprising shaping the pre-shaped, compressed mixture into a cube.

23. The method of claim 13 further comprising shaping the pre-shaped, compressed mixture into a granule.

24. The method of claim 13 further comprising porosity enhancers.

25. The method of claim 24, wherein the porosity enhancers are take from the group consisting of sand, glass particles, glass fibers, glass filaments, and mixtures thereof.

26. The method of claim 13 further comprising at least one lipid.

27. The method of claim 13 further comprising between about 5% and about 20% weight by weight of the multivalent metal; between about 5% and about 80% weight by weight of the fibrous organic portion; up to about 90% weight by weight of a porosity enhancer; and between about 1% and 2% lipid.

* * * * *